United States Patent
Tominaga

(10) Patent No.: US 12,280,795 B2
(45) Date of Patent: Apr. 22, 2025

(54) VEHICLE CONTROL DEVICE

(71) Applicant: Hitachi Astemo, Ltd., Hitachinaka (JP)

(72) Inventor: Takeyuki Tominaga, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 196 days.

(21) Appl. No.: 17/928,816

(22) PCT Filed: Feb. 25, 2021

(86) PCT No.: PCT/JP2021/007118
§ 371 (c)(1),
(2) Date: Nov. 30, 2022

(87) PCT Pub. No.: WO2022/059227
PCT Pub. Date: Mar. 24, 2022

(65) Prior Publication Data
US 2023/0303115 A1 Sep. 28, 2023

(30) Foreign Application Priority Data
Sep. 18, 2020 (JP) .................................. 2020-157827

(51) Int. Cl.
*B60W 60/00* (2020.01)
*B60W 30/18* (2012.01)
*B60W 40/06* (2012.01)

(52) U.S. Cl.
CPC .... *B60W 60/001* (2020.02); *B60W 30/18159* (2020.02); *B60W 40/06* (2013.01);
(Continued)

(58) Field of Classification Search
CPC ......... B60W 60/001; B60W 30/18159; B60W 40/06; B60W 2552/10; B60W 2552/53;
(Continued)

(56) References Cited

FOREIGN PATENT DOCUMENTS

| JP | 2018-105636 A | 7/2018 |
| JP | 2019-12130 A | 1/2019 |
| JP | 2020-35217 A | 3/2020 |

OTHER PUBLICATIONS

International Search Report (PCT/ISA/210) issued in PCT Application No. PCT/JP2021/007118 dated Apr. 20, 2021 with English translation (four (4) pages).
(Continued)

*Primary Examiner* — Hussein Elchanti
*Assistant Examiner* — Micah Chuen-Him Cheng
(74) *Attorney, Agent, or Firm* — Crowell & Moring LLP

(57) ABSTRACT

An object of the present invention is to provide a vehicle control device configured, regardless of the number of travel lanes of a road, to generate a travel route based on a road width of the road or the like, so as to improve a continuous automatic driving system. The present invention provides a vehicle control device configured to perform vehicle control of a self vehicle based on information of a position of the self vehicle, information of a map, and information of a route. The vehicle control device determines, at a specific spot of the route, whether or not a travel lane (311) of the self vehicle has a lane width (Wr1) that allows a plurality of virtual vehicles (303 and 304) to travel parallel to each other, and on determination that the travel lane has the lane width, the vehicle control device generates, on the travel lane, a plurality of virtual lanes and virtual lane center lines (332 and 333) of the plurality of virtual lanes.

5 Claims, 8 Drawing Sheets

(52) U.S. Cl.
CPC ..... *B60W 2552/10* (2020.02); *B60W 2552/53* (2020.02); *B60W 2556/40* (2020.02)

(58) Field of Classification Search
CPC ......... B60W 2556/40; B60W 2552/00; B60W 2556/50; G01C 21/36; G08G 1/16; G09B 29/00
See application file for complete search history.

(56) References Cited

OTHER PUBLICATIONS

Japanese-language Written Opinion (PCT/ISA/237) issued in PCT Application No. PCT/JP2021/007118 dated Apr. 20, 2021 (four (4) pages).

Howard et al., "State Space Sampling of Feasible Motions for High-Performance Mobile Robot Navigation in Complete Environments", Journal of Field Robotics, 2008, pp. 325-345, vol. 25, No. 6-7, (21 pages).

VEHICLE CONTROL DEVICE

TECHNICAL FIELD

The present invention relates to a vehicle control device configured to control automatic traveling of a vehicle.

BACKGROUND ART

Currently, autonomous travel techniques and driving support techniques are developed such that a moving object, e.g., a robot or an automobile, collects information surrounding the moving object and presumes a current position and a travel state of the moving object, so as to control a travel of the moving object. The autonomous travel techniques include a method to generate and use a route to a destination based on a high-accuracy map including, not only information regarding whether or not there is a road on the route, but also lane information and road information (e.g., stop lines or road signs), and the lane information includes a lane center line generated by a sequence of central points, each of which passes through a center of the corresponding lane, and a road width related to the lane center line (PTL 1).

The autonomous travel techniques also include a state space sampling method as an algorithm to generate a plurality of paths on a travel route (NPL 1). In this known method, an arrival spot is arranged ahead of a vehicle, and any one of the plurality of paths that does not overlap the arrival spot is to be generated. A sampling method of the arrival spot includes a uniform polar sampling method where the arrival spots are spaced evenly and arranged in an arc shape ahead of the vehicle.

With improvements of automatic driving techniques, the automatic driving is used in an increasing number of situations, leading to a demand for countermeasures in local traffic conditions of urban areas. For example, when the vehicle travels on a road with each travel lane having a greater lane width, two vehicles travel in parallel, one to travel straight ahead and the other to turn right, at a section of the corresponding lane before an intersection. Here, even when a driver has no clear information, e.g., white lines or road signs, the driver is aware of a virtual lane for traveling straight ahead or a virtual lane for turning right, based on which the driver spontaneously drives the vehicle. Thus, the vehicle traveling straight ahead is not to be held by the vehicle stopping to turn right.

CITATION LIST

Patent Literature

PTL 1: JP 2019-12130 A

Non-Patent Literature

NPL 1: T. M. Howard, C. J. Green, A. Kelly and D. Ferguson, "State Space Sampling of Feasible Motions for High-Performance Mobile Robot Navigation in Complete Environments", Journal of Field Robotics, no. 25, pp. 325-345, 2008.

SUMMARY OF INVENTION

Technical Problem

When the plurality of vehicles travel in parallel on one lane as described above, and when an automatic driving vehicle approaches the plurality of vehicles from behind, the automatic driving vehicle is expected to perform control as follows: (A) the automatic driving vehicle travels on an assumption of driving on a single lane, and thus stops at a center of the corresponding lane without selecting a position at a side of the lane where the vehicles ahead are stopping; (B) the automatic driving vehicle follows the nearest one of the vehicles ahead and stops behind the nearest one of the vehicles; or (C) the driver of the automatic driving vehicle stops the automatic driving to manually select a course, i.e., the virtual lane for turning right or the virtual lane for traveling straight ahead. Each of (A), (B), and (C) may have problems below.

In a case of (A), the automatic driving vehicle stops at the center of the lane, stopping vehicles behind from driving past. In other words, in a situation where the vehicles behind naturally turn right or move straight ahead to pass the intersection, the automatic driving vehicle stops these vehicles.

In a case of (B), the nearest one of the vehicles ahead may select a different route from the route that the automatic driving vehicle is expected to select, thereby resulting in unstable driving. For example, when the automatic driving vehicle is expected to travel straight ahead at the intersection but follows the nearest vehicle in the virtual lane for turning right, at the intersection, the automatic driving vehicle may leave the virtual lane for turning right to cut in the virtual lane for traveling straight ahead without putting on a turn signal.

In a case of (C), whenever the automatic driving vehicle approaches each of the intersections or junction spots, the driver is required to switch to the manual driving; and this frequent switching between the manual driving and the automatic driving may lead to driving errors. Additionally, the automatic driving vehicle is not fully effective in reducing load on the driver.

In NPL 1, in the cases of selecting the route in accordance with the situations above, no indicator is disclosed and thus, each of the plurality of paths needs to be evaluated, thereby resulting in an increased amount of calculation.

In view of respects described above, an object of the present invention is to provide a method to generate the travel route, regardless of the number of travel lanes on the road, based on a road width of the road or the like, so as to improve a continuous automatic driving system, as well as a method to reduce the amount of calculation required when route options are increased.

Solution to Problem

In order to achieve the object, the present invention provides a vehicle control device configured to perform vehicle control of a self vehicle based on information of a position of the self vehicle, information of a map, and information of a route. The vehicle control device includes: a lane width determination unit configured to determine, at a specific spot of the route, whether or not a travel lane of the self vehicle has a lane width that allows a plurality of vehicles to travel parallel to each other; and a virtual lane center line generation unit configured, when the lane width determination unit has determined that the travel lane of the self vehicle has, at the specific spot, the lane width that allows the plurality of vehicles to travel parallel to each other, to generate, on the travel lane of the self vehicle at the specific spot, a plurality of virtual lanes where the plurality of vehicles are allowed to travel parallel to each other, and a virtual lane center line in each of the plurality of virtual lanes.

Advantageous Effects of Invention

The present invention provides a vehicle control device configured, based on original techniques, to prevent an occurrence of stopping automatic driving, dangerous travel caused by the automatic driving, or others, so as to reduce load of control processing. Problems, configurations, and effects in addition to those described above will be clarified below in descriptions of embodiments.

DESCRIPTION OF EMBODIMENTS

First Embodiment

A vehicle control device according to a first embodiment of the present invention will be described below with reference to FIGS. 1 to 5. Note that, in the embodiments below, the vehicle control device according to the present invention is applied to a vehicle that travels on a left-hand side of a road, but may be applied to a vehicle that travels on a right-hand side of the road.

Figure 1:
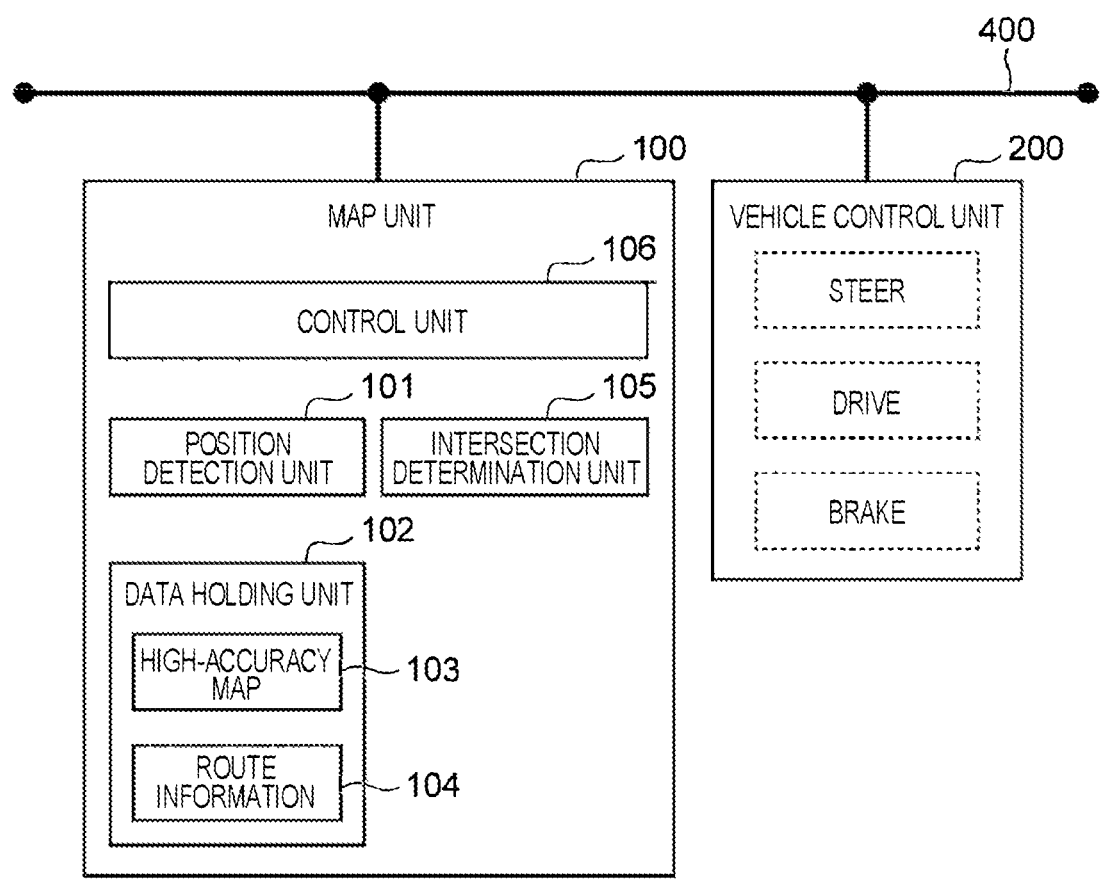
FIG. 1 is a block diagram of a vehicle control device according to a first embodiment.

First, FIG. 1 is a block diagram of the vehicle control device of this embodiment. Note that, the vehicle control device of this embodiment is configured, for example, as a computer system including an operation processing device, a storage device, an input/output circuit, a communication circuit (each not illustrated), or others. In the vehicle control device, the operation processing device reads and executes a computer program stored in the storage device, so that a map unit 100 and a vehicle control unit 200 function as will be described later.

The map unit 100 corresponds to a device configured to extract data for a high-accuracy map data surrounding a vehicle (self vehicle) based on position information of the self vehicle and to provide the data to other units. The map unit 100 includes a position detection unit 101, a data holding unit 102, a high-accuracy map 103, a route information 104, an intersection determination unit 105, and a control unit 106.

The position detection unit 101 detects coordinates representing a current position of the vehicle (self vehicle). In order to determine the current position of the vehicle (self vehicle), for example, a global navigation satellite system (GNSS) identifies a current coordinate of the vehicle (self vehicle), and further, a sensor, such as an inertial measurement unit (IMU) sensor, identifies a direction of the vehicle (self vehicle). Here, the position detection unit 101 may autonomously determine the current position of the vehicle (self vehicle), or may receive data indicating the current position of the vehicle (self vehicle) from external units of the map unit 100.

The data holding unit 102 includes a nonvolatile memory, a hard disc drive (HDD), or the like, and holds therein data such as the high-accuracy map 103 or a route information 104. The data holding unit 102 may not only hold the data in a medium thereof but also hold the data in a file server connected via a wireless communication.

The high-accuracy map 103 includes not only information regarding whether or not there is a road in a linkage of intersections, but also map information including, at least, lane information and road information (e.g., positions of traffic lights, stop lines, or road signs), and the lane information includes a lane center line generated by a sequence of central points, each of which passes through a center of the corresponding travel lane, roadside strips, and road widths.

The route information 104 corresponds to information indicating a route to a destination that a driver inputs on an input device (not illustrated) at start of travel, and is held in the data holding unit 102 during the travel. With this configuration, it is possible to previously determine the road where the vehicle (self vehicle) is to travel. Here, as the route information 104, the information indicating the route may be acquired during the travel, or may be acquired from the external units via communication means.

Based on the data for the position of the self vehicle and the direction of the self vehicle that the position detection unit 101 has detected, the intersection determination unit 105 acquires information for a position of the intersection that is located on the route in the direction where the self vehicle moves. Then, the intersection determination unit 105 determines a first intersection in the direction where the self vehicle moves.

The control unit 106 is configured by an operation device, e.g., a central processing unit (CPU) to execute software, and controls at least the position detection unit 101, the data holding unit 102, and the intersection determination unit 105.

When the control unit 106 has acquired, for example, information for the position of the intersection from the intersection determination unit 105, the control unit 106 sets, as a specific spot of the route, a section between the position of the intersection and a position spaced apart at a predetermined distance from the intersection toward the self vehicle. The control unit 106 includes a lane width determination unit and a virtual lane center line generation unit. The lane width determination unit is configured to determine whether or not the travel lane of the self vehicle has, at the specific spot of the route, a lane width predetermined, the lane width that allows a plurality of vehicles to travel parallel to each other, and when the lane width determination unit has determined that the travel lane of the self vehicle has the lane width predetermined, the virtual lane center line generation unit generates, on the travel lane of the self vehicle at the specific spot, a plurality of virtual lanes where the plurality of vehicles are allowed to travel parallel to each other, and a virtual lane center line in each of the plurality of virtual lanes.

The vehicle control unit 200 acquires, from the map unit 100, the map information, the route information, and the position information of the self vehicle, and performs automatic driving control such that the self vehicle travels along the route. The vehicle control unit 200 controls the vehicle (self vehicle) to travel along a lane center line of the travel lane. The vehicle control unit 200 includes a steering device, a drive device, a brake device, and others. The steering device is configured to control the direction where the vehicle (self vehicle) moves, and includes a power steering system controlled by a drive command from external units of the vehicle control unit 200. The power steering system includes an electric power steering system where a steering angle is controlled by an electric actuator, and a hydraulic power steering system where the steering angle is controlled by a hydraulic actuator.

The drive device is configured to drive the vehicle (self vehicle), and includes, for example, an engine system configured to control engine torque by an electric throttle or others based on the drive command from the external units, and an electric powertrain system configured to control drive force by an electric motor or others based on the drive command from the external units.

The brake device includes a brake system controlled based on a brake command from the external units, and the brake system includes an electric brake that is controllable by the electric actuator, a hydraulic brake that is controllable by the hydraulic actuator, or others.

A bus 400 includes an inter equipment bus (IEBUS), a local interconnect network (LIN), a controller area network (CAN), an IEEE 802.3 standard communication called Ethernet, or others.

Figure 2:
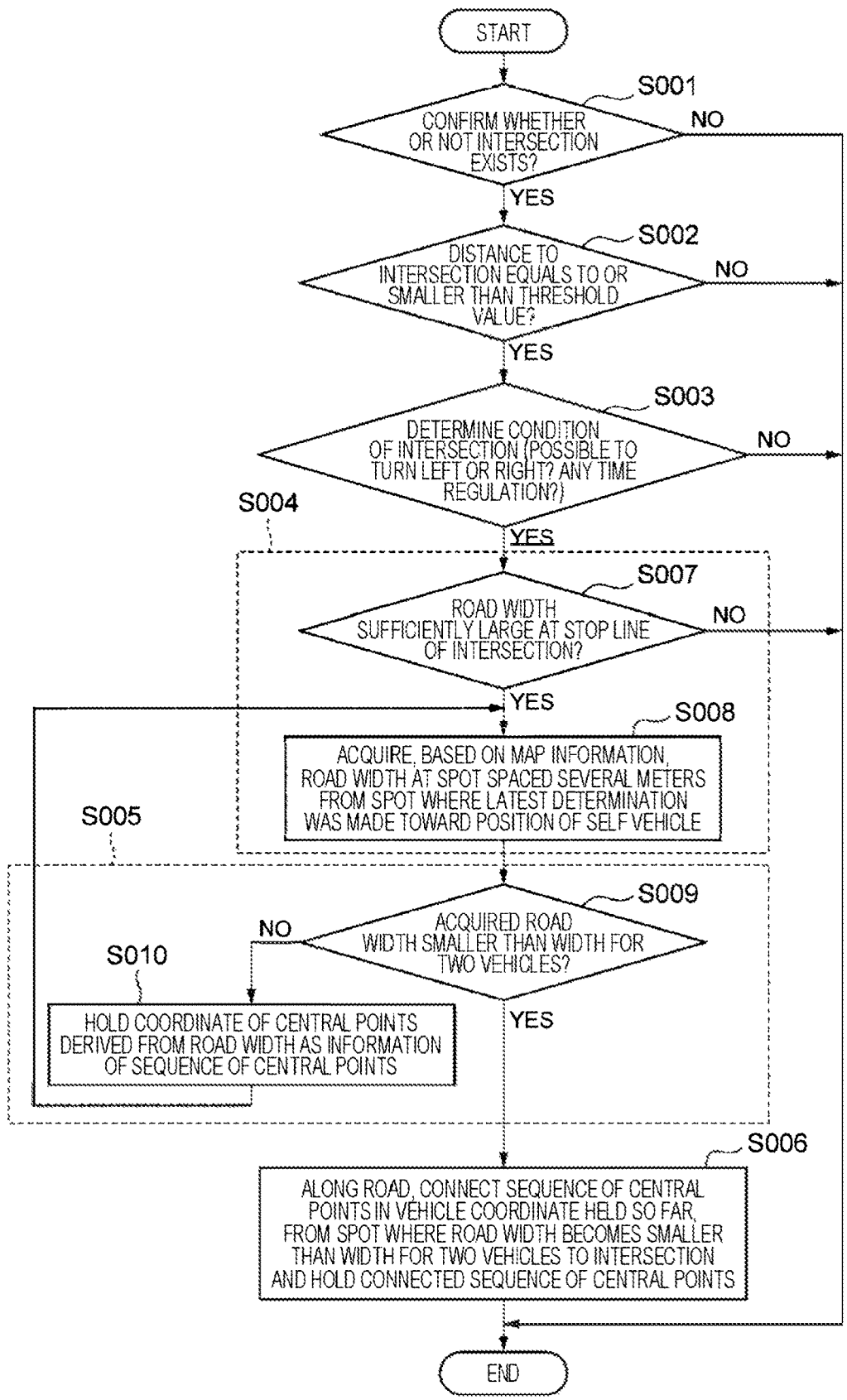
FIG. 2 is a flowchart illustrating an operation of the vehicle control device according to the first embodiment.

Next, a method where the control unit 106 generates the virtual lane center line will be described with reference to a flowchart of FIG. 2.

The virtual lane center line is generated based on the flowchart of FIG. 2, as will be described below.

In step 3001, based on the position of the self vehicle detected by the position detection unit 101 and the high-accuracy map 103 held in the data holding unit 102, the control unit 106 specifies the position of the self vehicle in the high-accuracy map 103, and determines whether or not any intersection is located in the direction where the self vehicle moves with reference to the route information 104. When the intersection is located in the direction, the control unit 106 proceeds to step S002 to determine whether or not to generate information regarding the virtual lanes at the specific spot, i.e., a section before the intersection.

In the step 3002, the control unit 106 determines whether or not a distance between the intersection extracted in the step S001 and the position of the self vehicle detected by the position detection unit 101 is equal to or smaller than a threshold value (e.g., 400 m). When the distance is equal to or smaller than the threshold value, the control unit 106 proceeds to step S003.

Figure 3:
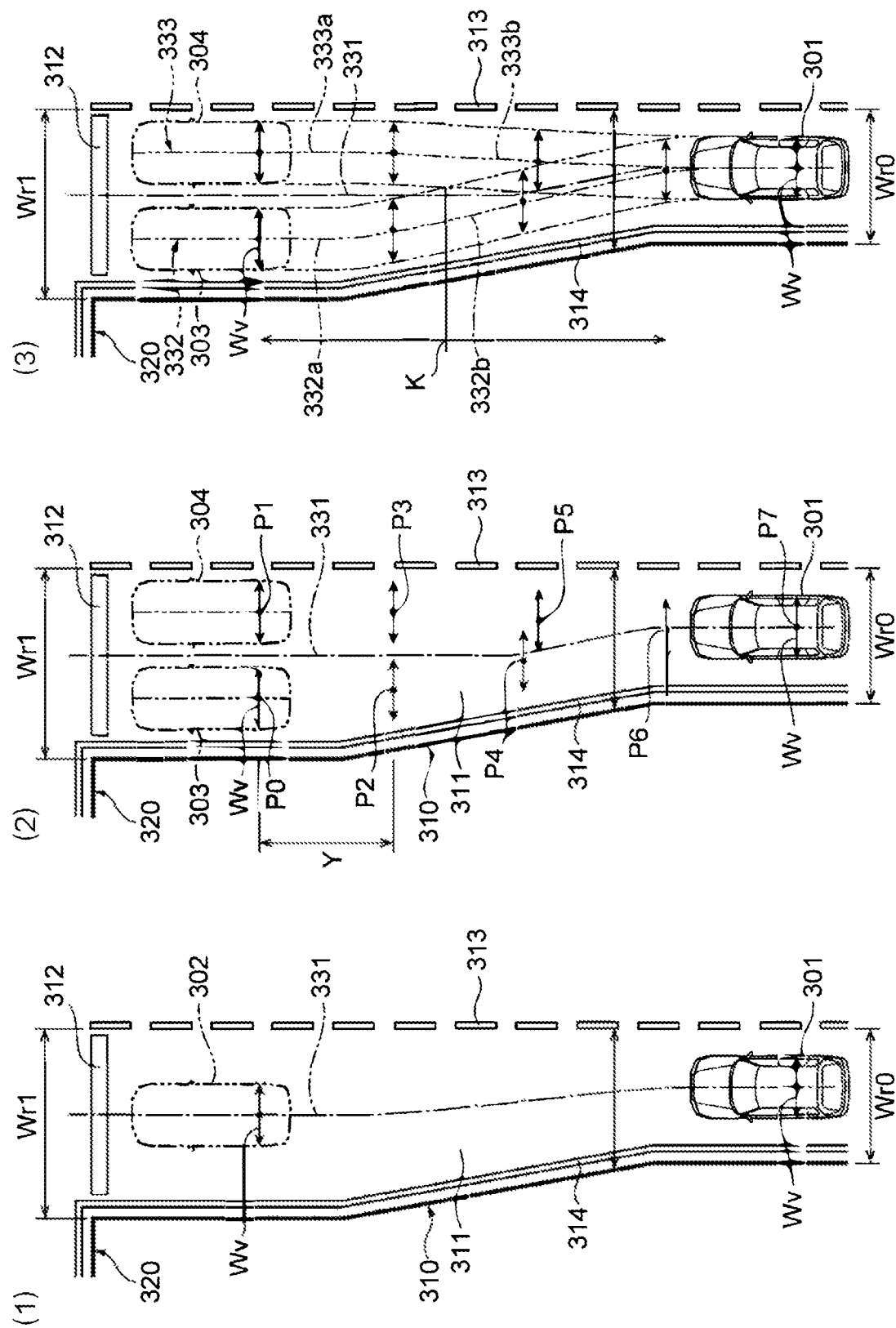
FIG. 3 is a diagram illustrating a method to generate a virtual lane.

FIG. 3 is a schematic diagram illustrating a method to generate each of the virtual lanes, and FIG. 3(1) is a schematic diagram illustrating a state where the self vehicle is spaced apart from the intersection at a distance equal to or smaller than the threshold value. For example, as illustrated in FIG. 3(1), a self vehicle 301 is under the automatic driving control of the vehicle control unit 200 to travel along a lane center line 331 of a travel lane 311 in a road 310. The self vehicle 301 is positioned before the intersection and traveling toward the intersection. The travel lane 311 is placed between a center line 313 and a road end. Here, the center line 313 is indicated on the road 310, and the road end is placed closer to an outer edge of the road 310 with respect to a roadside strip in a road width direction, and a stop line 312 is marked between the intersection and the travel lane 311. In an example illustrated in FIG. 3(1), the self vehicle is spaced apart from the intersection at the distance equal to or smaller than the threshold value. Thus, the control unit 106 proceeds to step S003.

In the step S003, the control unit 106 confirms whether or not the self vehicle is allowed to turn right or left at the intersection. The control unit 106 acquires, from the high-accuracy map 103, information regarding the intersection determined in the step S002, such as, whether or not there is a road to join after turning right or left at the intersection, there is any road sign, e.g., a no-right turn sign, or there is any regulation of time, days of the week, or vehicle types. Then, based on the information above, the control unit 106 determines whether or not the self vehicle is allowed to turn right or left at the intersection that is located from the self vehicle at the distance equal to or smaller than the threshold value. When the self vehicle is allowed to turn right or left, the control unit 106 proceeds to step S004 and subsequent steps, in order to determine whether or not it is possible to set, on the travel lane of the self vehicle, the plurality of virtual lanes where the plurality of vehicles are allowed to travel in parallel.

In the step 3004, the control unit 106 confirms whether or not the travel lane has a sufficient lane width, at the stop line placed at a border between the road and the intersection (step S007) For example, when the travel lane has the lane width that allows the plurality of vehicles to travel in parallel, the control unit 106 determines that the travel lane has the sufficient width. Here, the control unit 106 acquires, from the high-accuracy map 103, information regarding a position of the stop line at the intersection, and information regarding the lane width of the travel lane at the position of the stop line. Subsequently, the control unit 106 determines whether or not the lane width of the travel lane is equal to or greater than the width for two vehicles. In this embodiment, the vehicle width is defined as a legal maximum vehicle width of a vehicle (that is allowed to travel on roads), in addition to a predetermined margin.

For example, FIG. 3(2) illustrates a state where two virtual vehicles 303 and 304 are arranged in parallel on the travel lane before the stop line 312. Here, at the section before the intersection, a width Wr1 of the travel lane 311 is greater than vehicle widths 2Wv (=a vehicle width Wv+the vehicle width Wv) of the two virtual vehicles (Wr1>2Wv), and the control unit 106 thus determines that the travel lane at the specific spot has the sufficient width.

When the lane width of the travel lane is equal to or greater than the width for two vehicles at the position of the stop line, the control unit 106 determines that the lane width is sufficient, and divides the travel lane by the vehicle width from one side as a datum position to the other side in the road width direction. For example, the control unit 106 divides the travel lane by the vehicle width between a left end of the road (the road end) as the datum position and a center of the road, and the data holding unit 102 is to hold information regarding a position of a central point in each of the vehicle widths (for example, when the travel lane is divided into two vehicles, the data holding unit 102 is to hold two pieces of position information of the central points) In an example illustrated in FIG. 3(2), the data holding unit 102 is to hold position information of central points P0 and P1, each generated in the vehicle width Wv of the corresponding virtual vehicle, by which the travel lane has been divided in the direction from the left end of the road 310 as the datum position to the center line 313 of the road 310. Subsequently, the control unit 106 obtains, based on the map information, the lane width at a spot spaced apart at a constant distance Y from the spot where the latest determination was made toward the self vehicle (step S008), and proceeds to step S005.

In the step S005, based on the lane width acquired in the step S008, the control unit 106 repeats the same process as the step S004 with regard to a spot spaced apart at the constant distance Y (e.g., 3 m) from the central point toward the self vehicle, and determines whether or not the lane width of the travel lane is equal to or greater than the width for two vehicles. When the lane width of the travel lane is equal to or greater than the width for two vehicles, the control unit 106 proceeds to step S010. In the step S010, the control unit 106 causes the data holding unit 102 to hold, as information regarding the sequence of central points, the position information of the central points, each generated in the corresponding vehicle width, by which the travel lane has been divided in the direction from the left end of the road as the datum position to the center line of the road. Subsequently, the control unit 106 returns to the step S008.

In the example illustrated in FIG. 3(2), at the spot spaced apart at the constant distance Y from each of the central points P0 and P1 toward the self vehicle 301, the lane width of the travel lane 311 is equal to or greater than the width for two vehicles. Thus, the data holding unit 102 is to hold position information of central points P2 and P3, each generated in the vehicle width Wv of the corresponding virtual vehicle, by which the travel lane has been divided in the direction from the left end of the road 310 as the datum position to the center line 313 of the road 310.

In a loop process of the steps S008, S009, and S010, the control unit 106 acquires the position information of the central point in each of the vehicle widths along the travel lane from the intersection toward the self vehicle.

In the step S009, when the control unit 106 has determined that the lane width is smaller than the width for two vehicles at the spot spaced apart at the constant distance Y from the spot where the latest determination was made toward the self vehicle (step S009: YES), the control unit 106 proceeds to step S006.

In the step S006, the control unit 106 connects the sequence of the central points in the vehicle widths, each recorded until the spot described above, to the stop line of the intersection. Additionally, the control unit 106 complements the sequence of the central points from a spot where the lane width is determined equal to or smaller than the width for two vehicles toward the self vehicle, and records the sequence of the central points as the virtual lane center line (and holds as auxiliary data for the corresponding spots) in the high-accuracy map.

In an example illustrated in FIG. 3(3), the control unit 106 connects the central points in the vehicle widths Wv, each obtained in the step S005, from a spot K (where the lane width is determined equal to or smaller than the width for two vehicles) toward the stop line 312. Subsequently, the control unit 106 complements the sequence of central points from the spot K (where the lane width is determined equal to or smaller than the width for two vehicles) toward the self vehicle 301, so as to generate virtual lane center lines 332 and 333.

Note that, with the travel lane having the lane width sufficient for the plurality of vehicles, when the travel lane is divided by the vehicle width in a lane width direction, the datum position is not only limited to the left end of the road. Alternatively, the datum position may be arranged at the divided line along the center of the road (e.g., the center line), and the travel lane may be divided by the vehicle width from the center line as the datum position toward an outer side of the lane in the lane width direction. Still alternatively, the datum position may be arranged at any one of the road ends and the center line based on, for example, which is more clearly recognizable.

Figure 4:
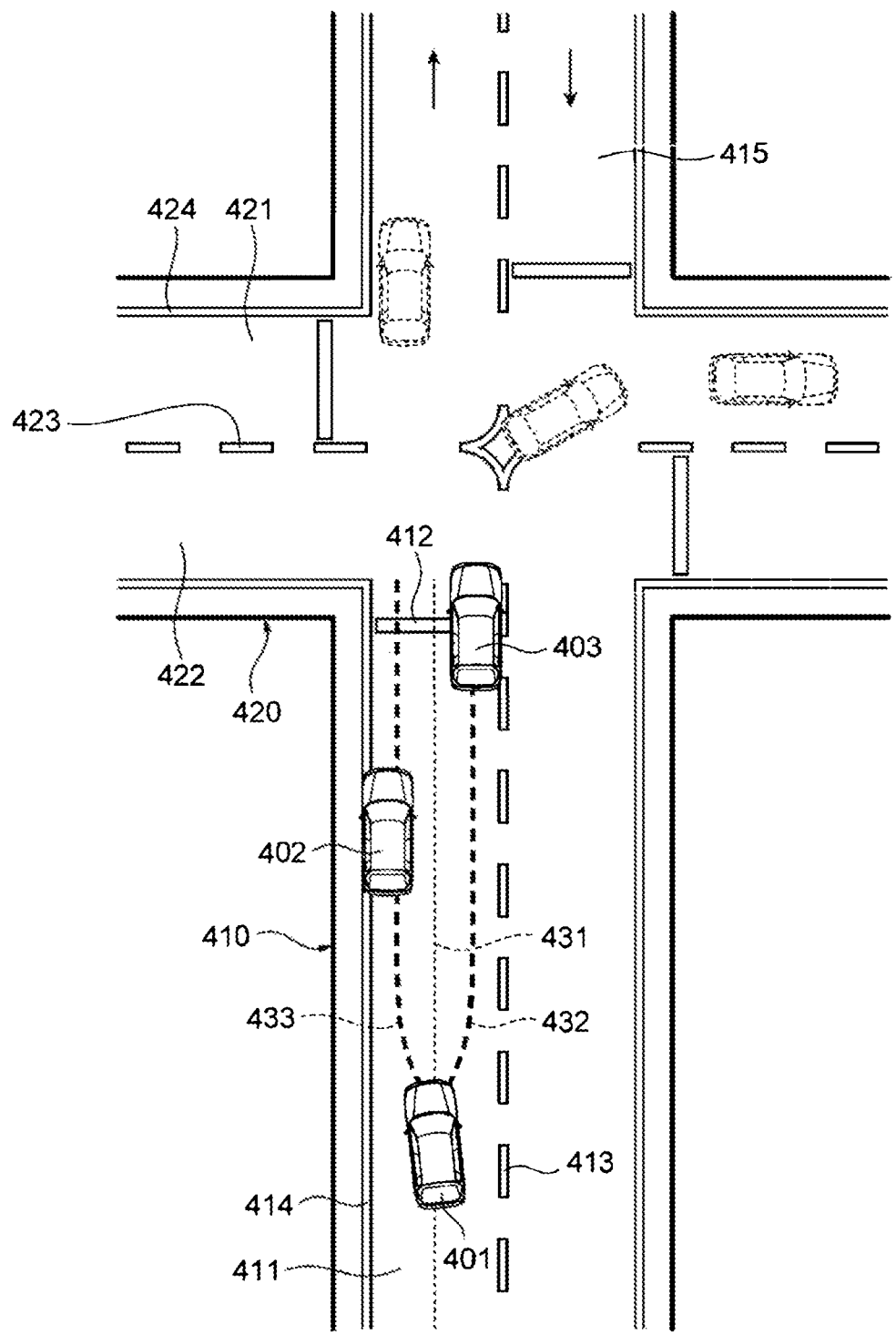
FIG. 4 is an overhead view of an intersection with a virtual lane center line of a virtual lane when the vehicle control device according to the first embodiment operates.

FIG. 4 is a schematic diagram where the intersection is viewed from above.

In an example illustrated in FIG. 4, a road 410 intersects with a road 420 at an intersection, and includes a travel lane 411, an opposite lane 415, and a center line 413. The travel lane 411 opposes the opposite lane 415 across the center line 413. The travel lane 411 corresponds to one lane of left-hand traffic, i.e., a single travel lane, and has the lane width that allows two vehicles to travel in parallel. The road 420 intersects with the road 410 at the intersection, and includes a travel lane 421 into which a vehicle (self vehicle) is to turn left from the travel lane 411, and a travel lane 422 into which a vehicle (self vehicle) is to turn right from the travel lane 411.

A self vehicle 401 travels on the travel lane 411 toward the intersection, under the automatic driving control to travel along a lane center line 431 of the travel lane 411. Ahead of the self vehicle 401, a vehicle 402 travels to the left and a vehicle 403 travels to the right of the travel lane 411. Here, the vehicle 402 is expected to travel straight ahead or turn left at the intersection to travel on the travel lane 422 of the road 420, and the vehicle 403 is expected to turn right at the intersection to travel on the travel lane 421 of the road 420.

In this embodiment, when the travel lane 411 has the lane width equivalent to the width for two vehicles, lane center lines (virtual lane center lines) 433 and 432 of virtual lanes where the two vehicles are allowed to travel in parallel are generated, and information of the virtual lane center lines 433 and 432 are provided to the vehicle control unit 200. Based on the information of the virtual lanes that the map unit 100 has generated, the vehicle control unit 200 corrects the route information. In order to perform the automatic driving control, the vehicle control unit 200 selects, in accordance with the situation ahead of the self vehicle 401, whether to pass through the lane center line 431 of the travel lane 411 or to pass through any one of the virtual lane center lines 433 and 432, and causes the self vehicle 401 to travel along the lane center line selected.

With this configuration, for example, when the vehicle 403 temporarily stops to wait to turn right, the self vehicle 401 is controlled to select a virtual lane to the left and move ahead along the virtual lane center line 433. Here, the self vehicle 401 is allowed to drive past the vehicle 403 to move ahead and pass the intersection, without stopping at the center of the travel lane 411 before the intersection and thus without blocking the road.

Accordingly, even when a travel situation of the vehicle ahead of the self vehicle is different from the lane information of the map, it is possible to continue with the automatic driving. Further, whenever the self vehicle approaches the intersection, the driver is not required to switch to the manual driving, and the continuous automatic driving is sufficiently effective to reduce the load on the driver.

Figure 5:
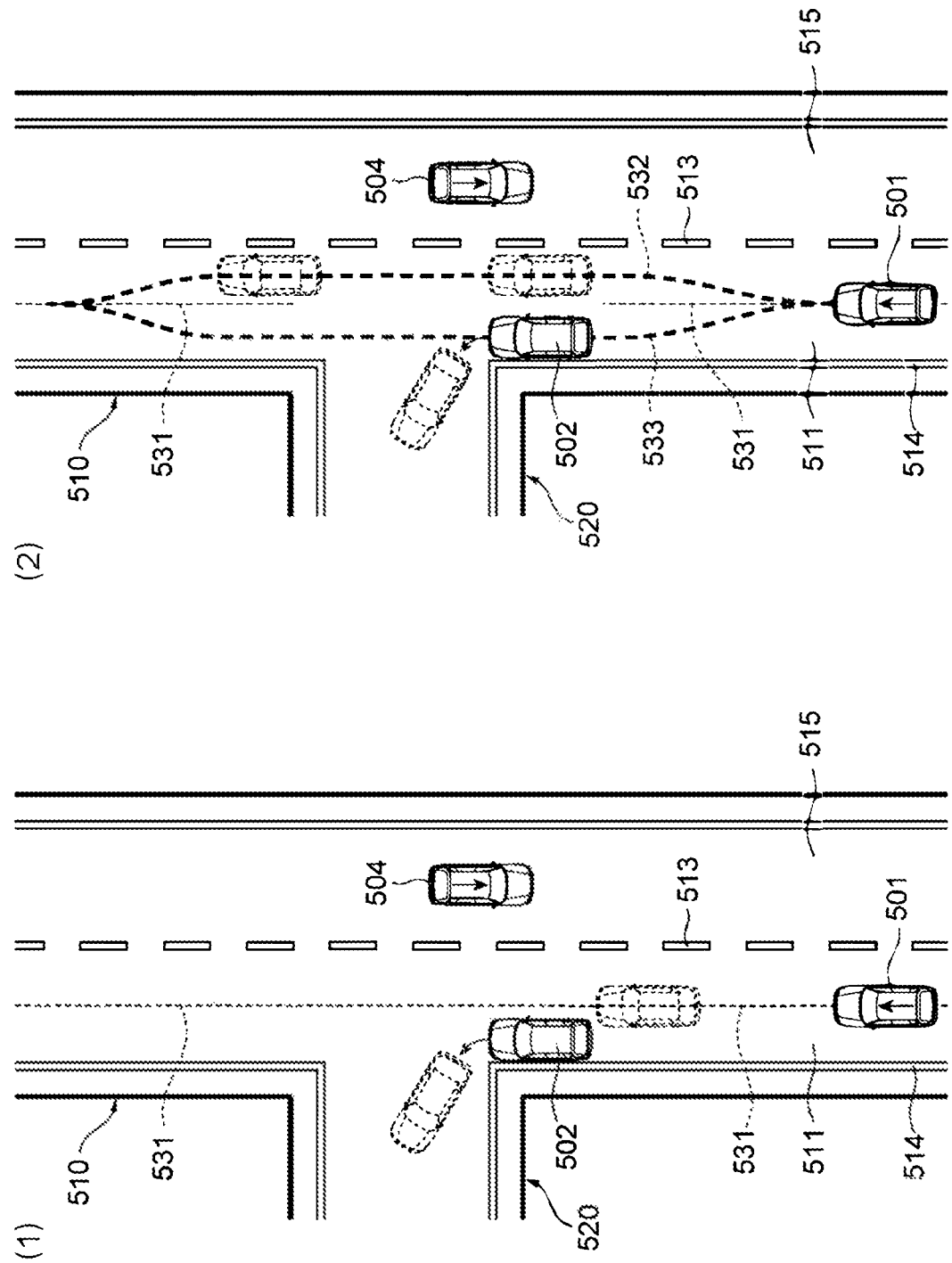
FIG. 5 is an overhead view of a road along the lane center line of the virtual lane that is generated at a spot where a vehicle turns into a side road off a main road.

FIG. 5 is an overhead view of a road with a virtual lane center line of a virtual lane that is generated at a spot where a vehicle (self vehicle) turns into a side road off the road.

In an example illustrated in FIG. 5, a road 510 includes a travel lane 511, an opposite lane 515, and a center line 513. The travel lane 511 opposes the opposite lane 515 across the center line 513. The travel lane 511 corresponds to one lane of left-hand traffic, i.e., a single travel lane, and has the lane width that allows two vehicles to travel in parallel. In a middle of the travel lane 511, a junction spot 520 is located such that the vehicle (self vehicle) moves into the side road off the road 510. In this embodiment, the junction spot 520 is also included in a concept of the intersection. For example, having acquired position information of the junction spot 520 from the intersection determination unit 105, the control unit 106 sets, as the specific spot of the route, a section between the junction spot 520 and a spot spaced apart at the predetermined distance from the junction spot 520 toward the self vehicle.

A self vehicle 501 travels on the travel lane 511 in a direction to pass the junction spot 520 to travel straight ahead, under the automatic driving control to travel along a lane center line 531 of the travel lane 511. Ahead of the self vehicle 501, a vehicle 502 travels to the left of the travel lane 511. The vehicle 502 is expected to turn left at the junction spot 520 to move into the side road.

In this embodiment, when the travel lane 511 has the lane width equivalent to the width for two vehicles before the junction spot 520, as illustrated in FIG. 5(2), lane center lines (virtual lane center lines) 533 and 532 of virtual lanes where the two vehicles are allowed to travel in parallel are generated, and information of the virtual lane center lines 533 and 532 are provided to the vehicle control unit 200. In order to perform the automatic driving control, the vehicle control unit 200 selects, in accordance with the situation ahead of the self vehicle 501, whether to pass through the lane center line 531 of the travel lane 511 or pass through any one of the virtual lane center lines 533 and 532.

With this configuration, for example, when the vehicle 502 temporarily stops to wait to turn left, the self vehicle 501 is controlled to select a virtual lane to the right and travels ahead along the virtual lane center line 532. Here, the self vehicle 501 is allowed to drive past the vehicle 502 to travel ahead and pass the intersection, without stopping at the lane center of the travel lane 511 before the junction spot 520 and thus without blocking the road.

Accordingly, even when a travel situation of the vehicle ahead of the self vehicle is different from the lane information of the map, it is possible to continue with the automatic driving. Further, whenever the self vehicle approaches the junction spot 520, the driver is not required to switch to the manual driving, and the continuous automatic driving is sufficiently effective to reduce the load on the driver.

Note that, in the foregoing embodiment, each of the travel lanes has two virtual lanes, but the present invention is not limited thereto, and in some cases, the corresponding travel lane may have three or more virtual lanes in accordance with the lane width.

Further, as seen in some foreign countries, even when a plurality of travel lanes are defined by dividing lines marked on a road surface, a greater number of vehicles than that of the plurality of travel lanes may ignore the dividing lines and travel parallel to each other by occupying as much space of the road as possible. In this case, the vehicle control device of this embodiment reads information of the dividing lines that define each of the travel lanes, based on which the vehicle control device generates information of the virtual lanes that do not overlap the dividing lines and where the vehicle is allowed to drive. In other words, based on the position information of the central points in the vehicle widths, by which the travel lane has been divided in the direction from the left end of the road as the datum position to the center line of the road, the vehicle control device generates the virtual lane center lines. Thus, it is possible to select an appropriate one of the virtual lanes to pass the specific spot, and to prevent the self vehicle from, for example, stopping between adjacent travel lanes and blocking the road.

Second Embodiment

Figure 6:
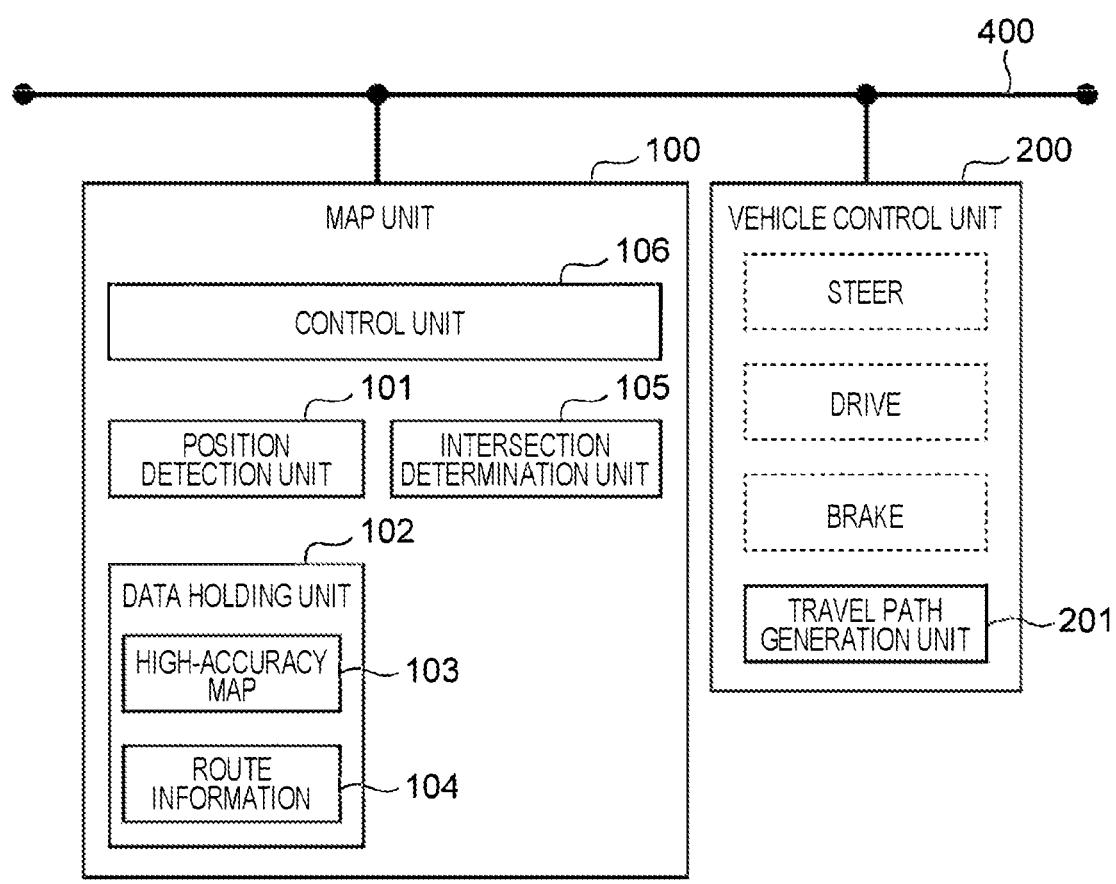
FIG. 6 is a block diagram of a vehicle control device according to a second embodiment.
Figure 7:
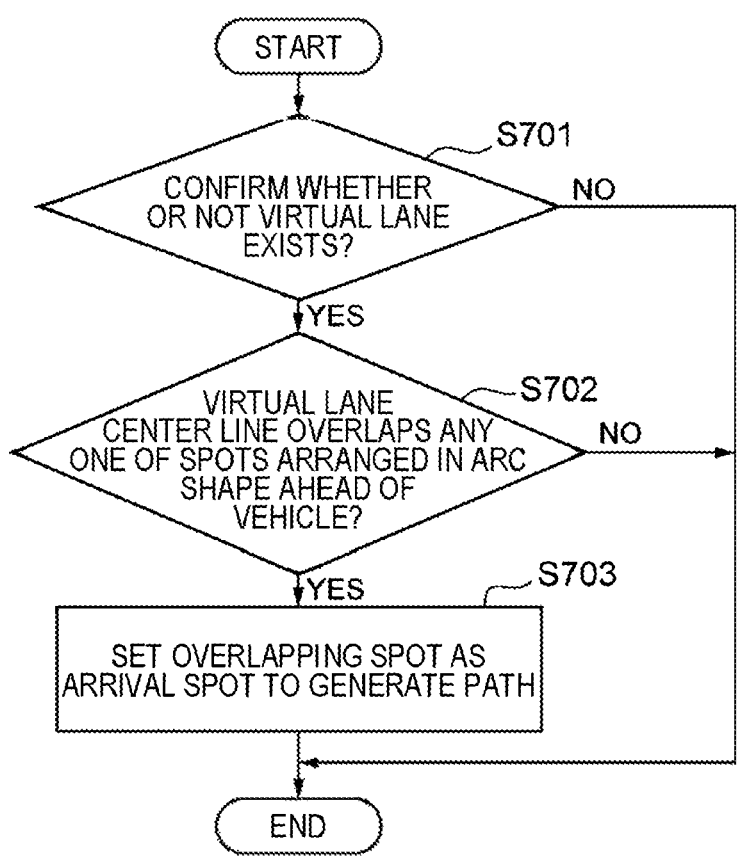
FIG. 7 is a flowchart illustrating an operation of the vehicle control device according to the second embodiment.

A vehicle control device according to a second embodiment of the present invention will be described with reference to FIGS. 6 to 8. First, FIG. 6 is a block diagram of the vehicle control device according to this embodiment. Note that, the same blocks to those described in FIG. 1 of the first embodiment are denoted with the same reference signs in the second embodiment.

The vehicle control unit 200 includes a travel path generation unit 201. The travel path generation unit 201 generates a plurality of paths on the travel route. As an algorithm to generate the plurality of paths, for example, a state space sampling method is known (NPL 1). In this known method, the plurality of paths generated do not intersect an arrival spot arranged ahead of the vehicle. With regard to a sampling method of the arrival spot, the vehicle control unit 200 uses a plurality of the sampling methods, e.g., Uniform Polar sampling or Biased Polar sampling, where the arrival spots are spaced evenly and arranged in an arc shape ahead of the vehicle, and checks whether or not each of the paths collides with the others.

The vehicle control unit generates the plurality of paths based on a flowchart of FIG. 7, as will be described below.

In step 3701, the travel path generation unit 201 checks whether or not the map information or the route information read from the map unit 100 includes information of the virtual lanes. When the information acquired from the map unit 100 includes the information of the virtual lane center lines, the travel path generation unit 201 proceeds to step S702.

In the step 3702, the travel path generation unit 201 determines whether or not the virtual lane center line overlaps the spots arranged in the arc shape ahead of the self vehicle. Here, as the method to generate the paths, the travel path generation unit 201 confirms whether or not each of the virtual lane center lines overlap any one of temporary target positions that are used to set the arrival spots and arranged in the arc shape in the direction where the self vehicle travels. When the corresponding virtual lane center line overlaps any one of the temporary target positions, the travel path generation unit 201 proceeds to step 3703. In the step S703, the travel path generation unit 201 sets, as one of the arrival spots, a spot where the corresponding virtual lane center line overlaps the temporary target position, and proceeds to generate the path. Based on the information of the virtual lanes that the map unit 100 has generated, the vehicle control unit 200 corrects the route information. When correcting the route information, the vehicle control unit 200 selects the spot where the corresponding virtual lane center line intersects the temporary target position as a sampling arrival spot, based on which the path is to be generated.

Figure 8:
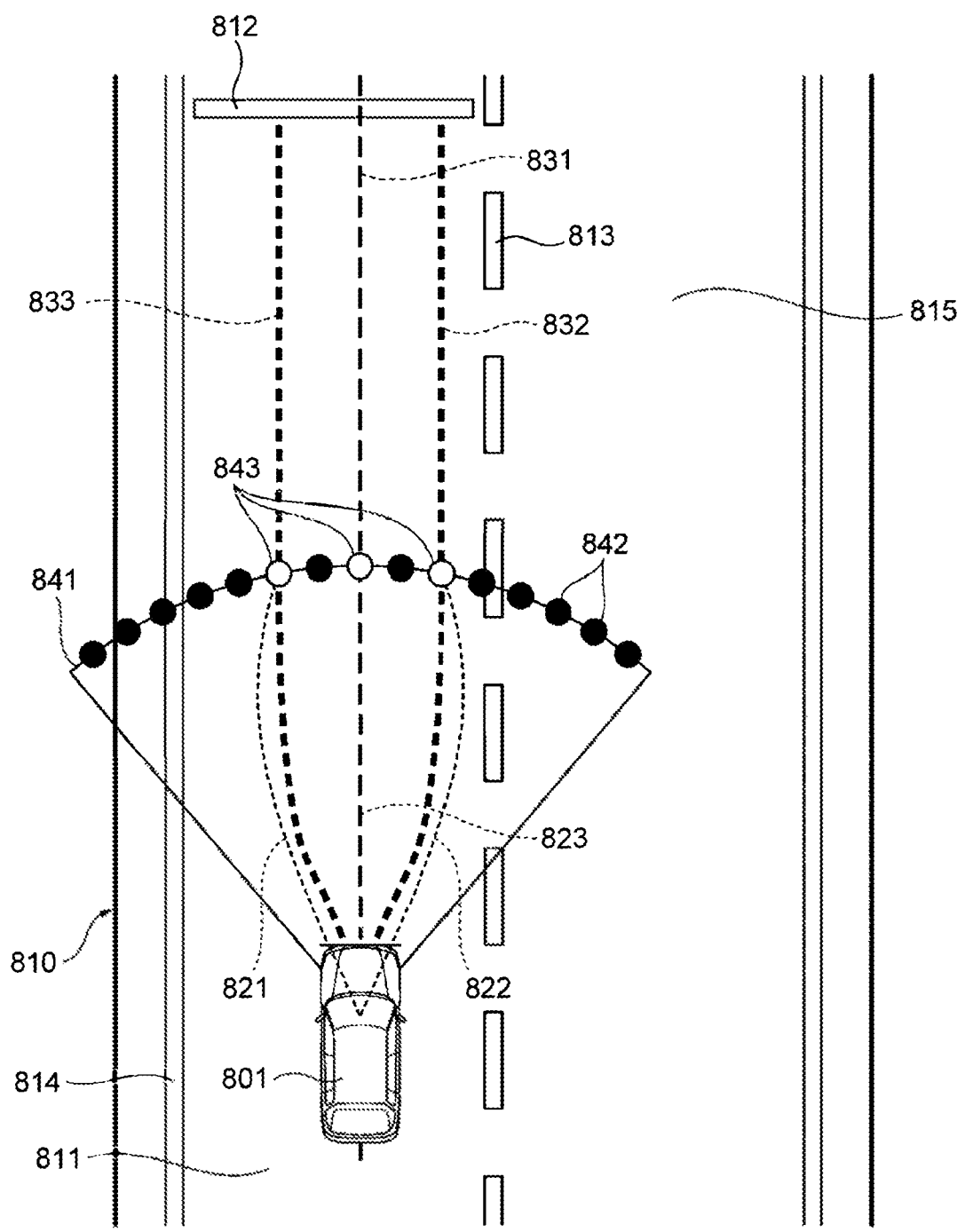
FIG. 8 is a diagram illustrating an example of a plurality of paths that the vehicle control device according to the second embodiment arranges on a travel route.

FIG. 8 is a diagram illustrating an example of the plurality of paths that the vehicle control device according to the second embodiment sets on the travel route. In an example illustrated in FIG. 8, a road 810 includes a travel lane 811, an opposite lane 815, and a center line 813. The travel lane 811 opposes the opposite lane 815 across the center line 813. The travel lane 811 corresponds to one lane of left-hand traffic, i.e., a single travel lane, and has the lane width that allows two vehicles to travel in parallel. A self vehicle 801 travels on the travel lane 811 under the automatic driving control to travel along a lane center line 831 of the travel lane 811.

In this embodiment, when the travel lane 811 has the lane width equivalent to the width for two vehicles, lane center lines (virtual lane center lines) 833 and 832 of virtual lanes where the two vehicles are allowed to travel in parallel are generated, and information of the virtual lane center lines 833 and 832 are provided to the vehicle control unit 200. In order to perform the automatic driving control, the vehicle control unit 200 selects, in accordance with the situation ahead of the self vehicle 801, whether to pass through the lane center line 831 of the travel lane 811 or pass through any one of the virtual lane center lines 833 and 832.

The travel path generation unit 201 sets a plurality of temporary target positions 842 in the arc shape ahead of the self vehicle 801. Subsequently, the travel path generation unit 201 determines whether or not any one of the plurality of temporary target positions 842 overlaps the lane center line 831 of the travel lane 811, the virtual lane center line 833, or the virtual lane center line 832. The travel path generation unit 201 selects, from the plurality of temporary target positions 842, three overlapping spots 843 as the arrival spots, based on which the travel path generation unit 201 generates three paths 821, 822, and 823.

By following the steps S701 to S702 as has been described above, when the self vehicle travels on a road with each travel lane having a greater lane width, when on the corresponding lane before the intersection, two vehicles travel in parallel, one to travel straight ahead and the other to turn right, and when the self vehicle needs to select the route by the automatic control system without any clear information, e.g., road signs or white lines, the self vehicle is still capable of selecting an effective path among the path options. With this configuration, it is possible to effectively reduce an amount of calculation required to generate the path.

With regard to the foregoing embodiments described above, the present invention is not limited thereto. Accordingly, it is easily understood that any change, addition, or deletion of a configuration of each unit appropriately made within the spirit of the present invention will naturally fall within the scope of claims of the present invention. For example, the detailed description of each of configurations in the foregoing embodiments is to be considered in all respects as merely illustrative for convenience of description, and thus is not restrictive. Additionally, a configuration of an embodiment may be partially replaced with and/or may additionally include a configuration of other embodiments.

Further, any addition, removal, and replacement of other configurations may be partially made to, from, and with a configuration in each embodiment. For example, the vehicle control unit 200 may include the map unit 100 therein, or the data for the high-accuracy map and/or the route information held by the map unit 100 may be held in an external server of the vehicle and transmitted and/or received via communication means.

REFERENCE SIGNS LIST

100 map unit
101 position detection unit
102 data holding unit
103 high-accuracy map
104 route information
105 intersection determination
106 control unit
200 vehicle control unit
201 travel path generation unit
400 bus

The invention claimed is:

1. A vehicle control device configured to perform vehicle control of a self vehicle based on information of a position of the self vehicle, information of a map, and information of a route, the vehicle control device comprising:
   a lane width determination unit configured to determine whether or not a travel lane of the self vehicle has, at a specific spot of the route, a lane width that allows a plurality of vehicles to travel parallel to each other;
   a virtual lane center line generation unit configured, when the lane width determination unit has determined that the travel lane of the self vehicle has, at the specific spot, the lane width that allows the plurality of vehicles to travel parallel to each other, to generate, on the travel lane of the self vehicle at the specific spot, a plurality of virtual lanes where the plurality of vehicles are allowed to travel parallel to each other, and a virtual lane center line in each of the plurality of virtual lanes,
   a position detection unit configured to detect the position of the self vehicle;
   a data holding unit configured to hold a high-accuracy map and the information of the route, wherein
      the lane width determination unit reads the position of the self vehicle that the position detection unit has detected, and reads information of the lane width from the high-accuracy map, and
      the virtual lane center line generation unit generates information of each of the plurality of virtual lanes where the self vehicle is allowed to travel;
   an intersection determination unit configured to determine a first intersection in a direction where the self vehicle at the specific spot moves, wherein
      the intersection determination unit determines whether or not a distance between the intersection and the self vehicle is equal to or smaller than a threshold value, and whether or not the self vehicle is allowed to turn left or right at the intersection, and
      when the distance between the intersection and the self vehicle is equal to or smaller than the threshold value and when the self vehicle is allowed to turn left or right at the intersection, the virtual lane center line generation unit reads, from the high-accuracy map, the information of the lane width between a position of a stop line of the intersection and the position of the self vehicle, so as to generate the information of each of the plurality of the virtual lanes until the specific spot where the plurality of vehicles are allowed to travel parallel to each other, and hold the information of each of the plurality of virtual lanes in the data holding unit.

2. The vehicle control device according to claim 1, wherein
   the virtual lane center line generation unit divides, at the specific spot, the travel lane by a vehicle width from one side of the travel lane as a datum position to an other side of the travel lane in a road width direction, so as to acquire information of a position of a central point in each of the vehicle widths,
   the virtual lane center line generation unit acquires the information of the position of the central point in each of the vehicle widths at every predetermined distance from the specific spot toward the self vehicle along the travel lane, and the virtual lane center line generation unit links the information of the position of the central point in each of the vehicle width in a direction of the travel lane, so as to generate the virtual lane center line.

3. The vehicle control device according to claim 1, wherein the virtual lane center line generation unit reads information of a dividing line that defines the travel lane, so as to generate the information of each of the plurality of virtual lanes where the self vehicle is allowed to travel and that does not overlap the dividing line.

4. The vehicle control device according to claim 1 further configured, in accordance with the information of each of the plurality of virtual lanes that the virtual lane center line generation unit has generated, to correct the information of the route.

5. The vehicle control device according to claim 4 further configured, when correcting the information of the route, to select a spot where the virtual lane center line in each of the plurality of virtual lanes intersects a temporary target position as a sampling arrival spot of a path to be generated.

* * * * *